(12) United States Patent
Galloway et al.

(10) Patent No.: US 8,100,006 B2
(45) Date of Patent: Jan. 24, 2012

(54) LIQUID LEVEL MEASUREMENT DEVICE AND INSTALLATION INCORPORATING THE SAME

(75) Inventors: Iain Galloway, Stratford (CA); Kelly Galloway, Stratford (CA)

(73) Assignee: Engineering Technologies Canada Ltd., Stratford, Prince Edward Island (CA)

( * ) Notice: Subject to any disclaimer, the term of this patent is extended or adjusted under 35 U.S.C. 154(b) by 196 days.

(21) Appl. No.: 11/842,513

(22) Filed: Aug. 21, 2007

(65) Prior Publication Data

US 2008/0060430 A1 Mar. 13, 2008

Related U.S. Application Data

(60) Provisional application No. 60/838,881, filed on Aug. 21, 2006, provisional application No. 60/924,270, filed on May 7, 2007.

(51) Int. Cl.
G01F 23/00 (2006.01)

(52) U.S. Cl. .................. 73/290 V; 73/290 R

(58) Field of Classification Search .......... 73/290 V
See application file for complete search history.

(56) References Cited

U.S. PATENT DOCUMENTS

| | | | | |
|---|---|---|---|---|
| 3,851,333 A * | 11/1974 | Fishman | ............... | 137/487.5 |
| 4,130,018 A * | 12/1978 | Adams et al. | ............... | 73/290 V |
| 4,221,004 A * | 9/1980 | Combs et al. | ............... | 367/114 |
| 4,228,530 A * | 10/1980 | Bergey | ............... | 367/112 |
| 4,675,660 A * | 6/1987 | Boscolo | ............... | 340/612 |
| 4,958,518 A * | 9/1990 | Duenstl et al. | ............... | 73/290 V |
| 4,991,433 A * | 2/1991 | Warnaka et al. | ............... | 73/290 V |
| 5,062,295 A * | 11/1991 | Shakkottai et al. | ............... | 73/290 V |
| 5,136,299 A * | 8/1992 | Edvardsson | ............... | 342/124 |
| 5,163,323 A * | 11/1992 | Davidson | ............... | 73/290 V |
| 5,207,101 A * | 5/1993 | Haynes | ............... | 73/597 |
| 5,303,585 A * | 4/1994 | Lichte | ............... | 73/290 V |
| 5,305,237 A * | 4/1994 | Dalrymple et al. | ............... | 702/55 |
| 5,586,085 A * | 12/1996 | Lichte | ............... | 367/99 |
| 6,053,041 A * | 4/2000 | Sinha | ............... | 73/290 V |
| 6,054,946 A * | 4/2000 | Lalla et al. | ............... | 342/124 |
| 6,073,492 A * | 6/2000 | Rosselson et al. | ............... | 73/644 |
| 6,184,818 B1 * | 2/2001 | Meinel | ............... | 342/124 |
| 6,202,484 B1 * | 3/2001 | Willner et al. | ............... | 73/290 V |
| 6,295,874 B1 * | 10/2001 | Strutt et al. | ............... | 73/597 |
| 6,598,473 B2 * | 7/2003 | Atkinson | ............... | 73/290 V |
| 6,832,516 B1 * | 12/2004 | Dam et al. | ............... | 73/290 V |
| 6,915,689 B2 * | 7/2005 | Edvardsson | ............... | 73/290 V |
| 6,983,654 B2 * | 1/2006 | Balin et al. | ............... | 73/290 V |
| 7,334,470 B1 * | 2/2008 | Bartoli et al. | ............... | 73/290 V |
| 7,421,895 B1 * | 9/2008 | Caldwell | ............... | 73/290 V |
| 7,532,155 B2 * | 5/2009 | Kleman et al. | ............... | 342/124 |
| 7,562,570 B2 * | 7/2009 | Peters | ............... | 73/290 V |
| 2004/0099058 A1 * | 5/2004 | Edvardsson | ............... | 73/290 V |
| 2004/0182149 A1 * | 9/2004 | Balin et al. | ............... | 73/290 V |
| 2007/0209434 A1 * | 9/2007 | Peters | ............... | 73/290 V |

* cited by examiner

*Primary Examiner* — Hezron E Williams
*Assistant Examiner* — Rodney T Frank
(74) *Attorney, Agent, or Firm* — Baker & Daniels LLP

(57) ABSTRACT

A liquid level measurement device comprises a generally seamless pipe for insertion into an installation in which liquid level is to be monitored and a non-contact sensor assembly disposed within the pipe at a location spaced above the liquid. The sensor assembly senses the level of the liquid and generates output representative of the liquid level.

27 Claims, 5 Drawing Sheets

LIQUID LEVEL MEASUREMENT DEVICE AND INSTALLATION INCORPORATING THE SAME

CROSS REFERENCE TO RELATED APPLICATIONS

This application claims the benefit of U.S. Provisional Application Ser. No. 60/838,881 filed on Aug. 21, 2006 and U.S. Provisional Application Ser. No. 60/924,270 filed on May 7, 2007, the contents of which are incorporated herein by reference.

FIELD OF THE INVENTION

The present invention relates generally to measuring devices and in particular, to a liquid level measurement device and an installation incorporating the same.

BACKGROUND OF THE INVENTION

Systems to disperse or treat household wastewater, sewage, stormwater and the like (hereinafter referred to as "wastewater") are well known in the art. For example, one conventional system for disposing with or dispersing wastewater comprises a septic tank receiving wastewater from the structure serviced by the treatment system, a distribution box receiving effluent from the septic tank and a subsurface absorption field receiving the effluent distributed by the distribution box. Alternatively, the treatment system may omit the distribution box and simply comprise a septic tank delivering effluent directly to the absorption field or may replace the distribution box with a pump or siphon that doses the absorption field with effluent from the septic tank.

The absorption field may be for example a gravel trench installation comprising an underground layer of crushed stone, gravel, synthetic material and/or other suitable material that creates an underground distribution trench or bed for effluent or water. An upper layer of cover or backfill material is disposed over the trench or bed and extends to finished grade. Alternatively, the absorption field may be a leaching chamber installation comprising an underground pre-fabricated leaching chamber or similar structure that creates an underground passageway for effluent or water. Similarly, a layer of cover or backfill material is disposed over the leaching chamber and extends to finished grade. Inspection ports or observation tubes (collectively referred to herein as "inspection ports") are sometimes provided in the installations described above to enable the liquid level therein to be monitored. Each inspection port typically comprises a cylindrical tube having a diameter in the range of from about three (3) inches to six (6) inches that extends deep enough into the installation to enable the liquid level therein to be measured. Holes are usually provided in the lower portion of the cylindrical tube to allow liquid accumulating in the absorption field to enter the inspection port so that the liquid level in the inspection port corresponds to the liquid level in the absorption field. A removable cap or plug overlies the cylindrical tube to seal the same when liquid level measurements are not being made. The cap or plug is typically positioned at or above the finished grade so that the liquid level in the installation can be checked without digging. In some instances however, owners of these installations bury the caps or plugs typically for aesthetic reasons. This of course makes checking the liquid levels more difficult and time consuming.

As will be appreciated, being able to monitor the liquid level in septic or stormwater absorption fields is important for a number of reasons. In particular, being able to monitor the liquid level in such an absorption field allows the capacity of the absorption field to be evaluated, allows the owner/operator to detect when the absorption field is reaching its ultimate capacity and allows the owner/operator to be alerted before the absorption field becomes overloaded. Overloading of the absorption field is of particular importance as it may result in wastewater or effluent backing up into the structure it services and/or wastewater or effluent breaking out onto the ground surface. Both of these conditions have serious negative public health and environmental impacts due to the possible presence of bacteria in the wastewater or effluent.

In the past, liquid levels in absorption fields have been measured by inserting a measuring stick or other object into the inspection port, removing the measuring stick from the inspection port and visually examining the measuring stick to determine how much of the measuring stick is wet. As will be appreciated, measuring liquid levels in this manner is time consuming, cumbersome and only provides liquid level measurements at snapshots in time.

Mechanical (i.e. mercury) float switches have also been used to sense liquid levels in absorption fields. Unfortunately, these float switches require large diameter tubes to provide for the minimum cord length required in order for the float to travel up and down. Also if different liquid levels are to be sensed, a separate float switch for each liquid level to be sensed is required. Furthermore, as the float switches are in direct contact with the wastewater or effluent, the float switches are prone to fouling as a result of biological matter buildup on the float switches.

Pressure transducers which sense liquid levels by detecting the change in liquid pressure acting on the pressure transducers have also been considered. As with mechanical float switches, these pressure transducers are also prone to fouling as a result of biological matter buildup on the pressure transducers. To avoid this problem, pressure transducers that detect the change in the air pressure in the underground trench, bed or leaching chamber bed as the liquid level therein changes have been used. Unfortunately these pressure transducers tend to produce unreliable results once air pressures dissipate and equalize.

Use of ultrasound sensors in sewer manholes and storm drains has also been considered. For example, U.S. Pat. No. 7,002,481 to Crane et al. discloses a monitoring system including one or more monitoring devices, positioned in sewer manholes, storm drain manholes or catch basins, etc., and a remote monitoring station that communicates wirelessly with the monitoring devices. Each monitoring device comprises sensors, a two-way telemetry unit, a power supply, a processor and supporting hardware, all located in an enclosed, waterproof housing. Each monitoring device is placed within a manhole cavity to obtain depth (e.g., water level) measurements and report the measurements back to the remote monitoring station, which analyzes the data and responds to alert messages when a dangerous water level is detected. The sample and reporting rates of the monitoring devices, as well as the water level threshold values, may be remotely programmable via commands transmitted from the remote monitoring station. An additional sensor may monitor the manhole cover for security purposes.

In addition to monitoring the liquid level in absorption fields and the like, monitoring the liquid level in groundwater wells and other types of wells is also important to detect situations where well levels rise to the point where the levels may interfere with the operation of sewer disposal systems or where bacteria and/or viruses present in the liquid may reach the groundwater table and cause contamination.

Although liquid level sensors are known, there exists a need for a reliable non-contact, liquid level measurement device suitable for use in installations comprising narrow diameter pipes extending into the liquid whose level is to be monitored. It is therefore an object of the present invention to provide a novel non-contact, liquid level measurement device and to an installation incorporating the same.

SUMMARY OF THE INVENTION

Accordingly, in one aspect there is provided a liquid level measurement device comprising:

a generally seamless pipe for insertion into an installation in which liquid level is to be monitored; and a non-contact sensor assembly disposed within said pipe at a location spaced above the liquid, said sensor assembly sensing the level of said liquid and generating output representative of said liquid level.

In one embodiment, the sensor assembly is an ultrasound sensor assembly. The ultrasound sensor assembly transmits an ultrasound energy wave down the mounting pipe and receives the return ultrasound energy wave reflected by the surface of the liquid. The sensor assembly measures the time taken for the transmitted ultrasound energy wave to travel to the surface of the liquid and reflect back to the sensor assembly thereby to sense the liquid level. If desired, the measured time taken may be adjusted to compensate for the density of the air by measuring the ambient temperature and/or humidity levels.

The liquid level measurement device may further comprise a communications interface to transmit the output to a remote unit. In one embodiment, the communications interface is a wired communications interface. In another embodiment, the communications interface is a wireless communications interface.

If desired, a mechanical backup sensor, such as for example a mechanical float or magnetic reed switch, may be included in the liquid level measurement device.

According to another aspect there is provided an installation comprising:

an underground region containing liquid;

at least one narrow diameter pipe extending into said region; and a non-contact liquid level measurement device disposed within said pipe, said liquid level measurement device measuring the liquid level in said region.

The liquid level measurement device is positioned within the pipe in a manner to inhibit interference. The liquid level measurement device is also positioned so that it typically remains spaced from liquid in the region.

The liquid level measurement device allows the liquid level of an installation such as for example, an absorption field, groundwater well or the like, to be monitored quickly and easily on a regular basis allowing an alarm condition to be signaled should a high liquid level occur that exceeds a threshold level. In this manner, the owner/operator can be alerted to the high liquid level condition allowing the owner/operator to take remedial action if appropriate. The liquid level measurement device also allows historical liquid level data to be logged. In the case of absorption fields, the historical liquid level data can be used to plan the distribution of effluent to different trenches or beds and/or to determine if and when the absorption field needs to be expanded. In the case of groundwater level monitoring, historical data concerning groundwater levels can be maintained and provided to regulatory agencies if required. Also, as the liquid level measurement device employs a non-contact sensor, cross-contamination of groundwater from bacteria or viruses which may be present on the liquid level measurement device is avoided.

BRIEF DESCRIPTION OF THE DRAWINGS

Embodiments will now be described more fully with reference to the accompanying drawings in which.

DETAILED DESCRIPTION OF THE EMBODIMENTS

Figure 1:
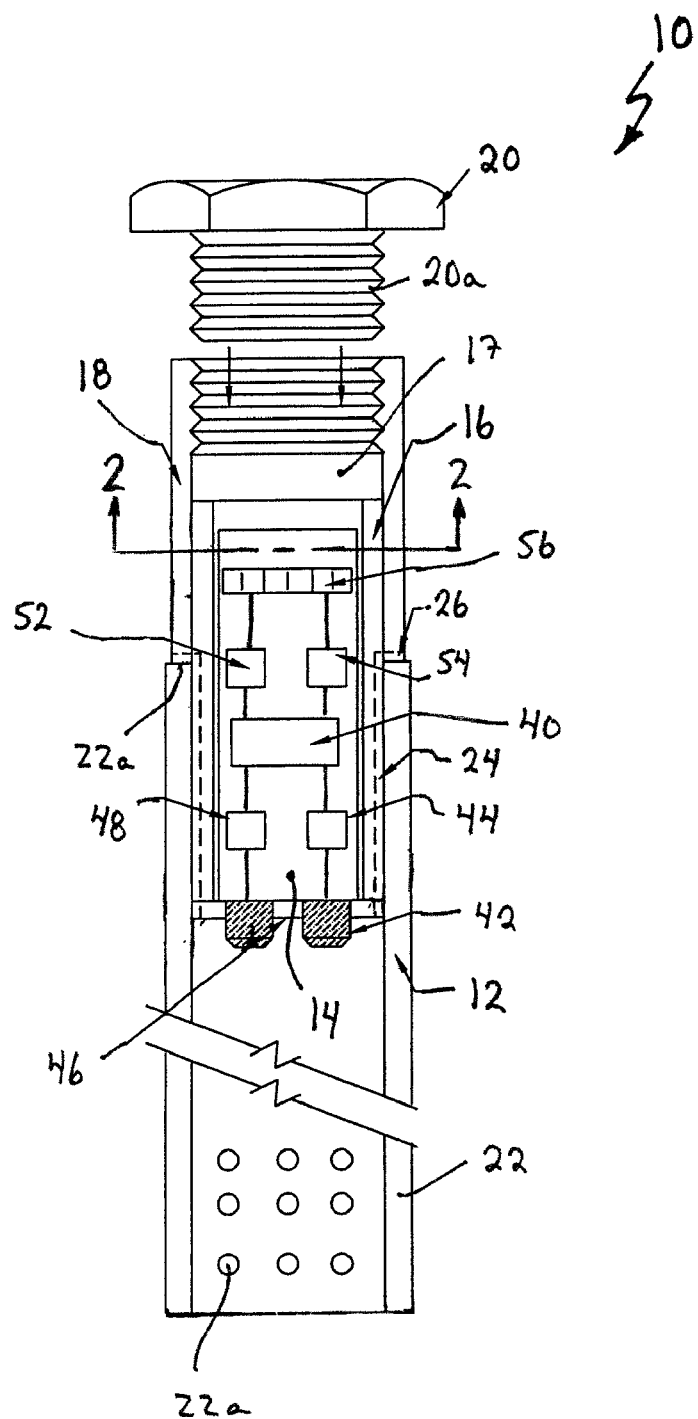
FIG. 1 is a side elevational view, in section, of a liquid level measurement device.
Figure 2:
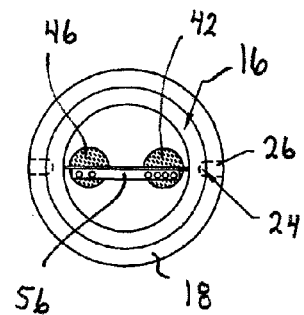
FIG. 2 is a sectional view of the liquid level measurement device of FIG. 1 taken along line 2-2.
Figure 3:
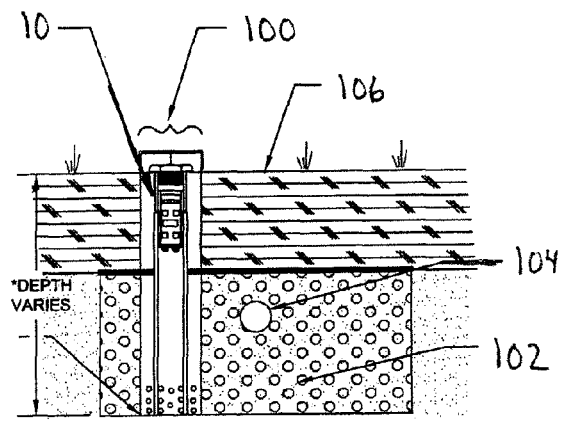
FIG. 3 is a side elevational view, in section, of the liquid level measurement device of FIG. 1 installed in an existing inspection port of a gravel trench installation.

Turning now to FIGS. 1 and 2, a liquid level measurement (LLM) device designed to determine the distance to or height (some referred to as "ponding level") of a liquid within an installation such as for example, an absorption field, groundwater well or other well, subsurface wastewater, septic or stormwater distribution trench or bed or the like, is shown and is generally identified by reference numeral 10. In this embodiment, the LLM 10 is to be inserted into an inspection port of an absorption field or the like and to sense the liquid level therein. As can be seen, LLM device 10 comprises a sensor assembly 12 mounted on a circuit board 14 disposed within an inner plastic sleeve 16. The circuit board 14 is suspended from a cap 17 at the top of the inner sleeve 16. An outer sleeve 18 is pressed onto and surrounds the upper portion of the inner sleeve 16. The interior wall of the outer sleeve 18 adjacent its upper end is threaded and receives a cap 20. Cap 20 comprises a threaded shank 20a that engages the threaded interior of the outer sleeve 18.

A mounting pipe 22 receives the lower portion of the inner sleeve 16. The diameter of the mounting pipe 22 is such that the top end 22a thereof abuts the bottom end of the outer sleeve 18. In this manner, the sensor assembly 12 is accurately positioned in the mounting pipe 22. The mounting pipe 22 is continuous and thus, is free of joints, seams or the like. The length of the mounting pipe 22 is selected so that the mounting pipe rests at the bottom of the absorption field. Holes 22a are provided in the lower portion of the mounting pipe 22 so that liquid entering the inspection port also enters the mounting pipe. In this manner, the liquid level in the mounting pipe 22 corresponds to the liquid level in the absorption field.

Air relief channels 24 are formed in the outer surface of the inner sleeve 16 and communicate with air relief slots 26 formed in the bottom end of the outer sleeve 18.

Sensor assembly 12 comprises a microcontroller 40 communicating with a transmit ultrasound transducer 42 via a transmit amplifier 44 and with a receive ultrasound transducer 46 via a receive amplifier 48. Microcontroller 40 also communicates with a thermistor or other temperature sensor (not shown) and a remote control unit (not shown) via a communications interface 52 such as for example an RS-485 wired interface. A switching regulator 54 is also provided on the circuit board 14 and provides appropriate regulated power to the components of the sensor assembly 12. The switching regulator 54 and the communications interface 52 are coupled to a terminal block 56 adjacent the top of the circuit board 14. The terminal block 56 receives the conductors extending from the LLM device power source and conductors from the remote control unit.

The circuit board 14 and the sensor assembly 12 are sealed within the inner sleeve 16 with the exception of the ultrasound transducers 42 and 46, which protrude from the sealed bottom of the inner sleeve. As the ultrasound transducers 42 and 46 are exposed, weather proof ultrasound transducers are used.

The remote control unit may be an interface to an alarm panel, a relay contact output, a liquid crystal display (LCD) or a light emitting diode (LED) level meter. The remote control unit calculates the liquid level in the absorption field based on data received from the LLM device 10 and signals an alarm condition if a high liquid level is detected in the absorption field that exceeds a threshold level. The remote control unit also maintains a historical log of liquid level data that can be used to plan the distribution of effluent to different trenches or beds and/or to determine if and when the absorption field needs to be expanded. If the remote control unit includes a display, the sensed liquid level and/or historical liquid level data may be displayed.

In use, the LLM device 10 is inserted into the inspection port of an absorption field for dispersing wastewater or stormwater. The length of the mounting pipe 22 is selected so that the mounting pipe rests at the bottom of the absorption field while positioning the sensor assembly 12 near the top of the inspection port. In this manner, the sensor assembly 12 remains safely spaced from liquid accumulating in the absorption field. In operation, the microcontroller 40 generates an ultrasonic frequency pulse at intervals and applies each pulse to the transmit amplifier 44. The transmit amplifier 44 in turn amplifies the pulse and conveys the pulse to the transmit ultrasound transducer 42. The transmit ultrasound transducer 42 in response, transmits an ultrasound energy wave that travels down the mounting pipe 22.

When the transmitted ultrasound energy wave encounters the surface of the liquid within the mounting pipe 22, the ultrasound energy wave is reflected and thus, travels back up the mounting pipe 22 towards the LLM device 10. When the reflected ultrasound energy wave reaches the LLM device 10, the ultrasound energy wave is detected by the receive ultrasound transducer 46. The receive ultrasound transducer 46 in response generates an electronic signal that is conveyed to the receive amplifier 48. The receive amplifier 48 amplifies the received signal and verifies that the received signal is the same ultrasonic frequency as the transmitted signal. The amplified and verified signal is then conveyed to the microcontroller 40. The microcontroller 40 in turn calculates how long it took the ultrasound energy wave to travel from the LLM device 10 to the surface of the liquid in the mounting pipe 22 and back. The calculated "round trip" time in milliseconds is adjusted by the microcontroller 40 using a zero liquid level measurement that is obtained during calibration of the LLM device 10. The microcontroller 40 also takes a temperature reading from the thermistor and conveys the adjusted "round trip" time and temperature reading to the communications interface 52. The communications interface 52 in turn transmits the adjusted round trip time and temperature reading to the remote control unit via the terminal block 56.

The remote control unit in response, uses the adjusted round trip time and temperature reading to calculate accurately the liquid level or total depth of the liquid in the installation and determine if a high liquid level condition that exceeds the threshold level exists. As will be appreciated, as the speed of sound in air varies according to temperature, the temperature reading allows the remote control unit to calculate accurately the liquid level. If a high liquid level condition exceeding the threshold level exists, the remote control unit signals an alarm condition. The signaled alarm condition may be for example an audio alarm, a visual alarm, and/or a networked notification such as an email message or other TCP/IP, modbus or similar protocol notification. In this manner, the owner/operator is alerted to the high liquid level condition allowing the owner/operator to take remedial action if appropriate.

As the mounting pipe 22 is free of joints, seams or the like, the transmitted and reflected ultrasound energy waves are able to travel within the mounting pipe with little, if any, interference. This helps to ensure liquid level sensing accuracy. As will be appreciated by those of skill in the art, disruptions in the interior surface of the mounting pipe may act as reflecting surfaces causing interference and possibly false liquid level readings.

The air relief channels 24 and air relief slots 26 inhibit air binding which may adversely interfere with the rise and fall of liquid in the absorption field especially in pressure dose situations where water and/or effluent is pumped into the absorption field very quickly.

Figure 4:
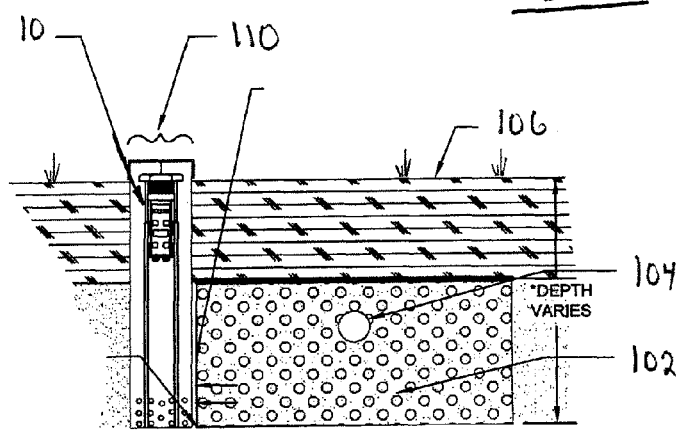
FIG. 4 is a side elevational view, in section, of the liquid level measurement device of FIG. 1, installed in a new or retrofit inspection port of another gravel trench installation.

FIGS. 3 to 6 show the LLM device 10 installed in various absorption fields for measuring the total depth of the liquid level in the absorption fields and for detecting high liquid level conditions. For example, in FIG. 3, the LLM device 10 is inserted into the existing inspection port 100 of a gravel trench installation with the end of the mounting pipe 22 resting at the bottom of the gravel trench installation. The gravel trench installation comprises an underground layer of crushed stone or gravel 102 receiving a perforated pipe 104 extending from a distribution box (not shown). A layer of cover or backfill material extending to finished grade 106 is disposed on the underground layer of crushed stone or gravel 102. In FIG. 4, a new or retrofit inspection port 10 is formed just outside the edge of an existing gravel trench installation and the LLM device 10 is inserted therein.

Figure 5:
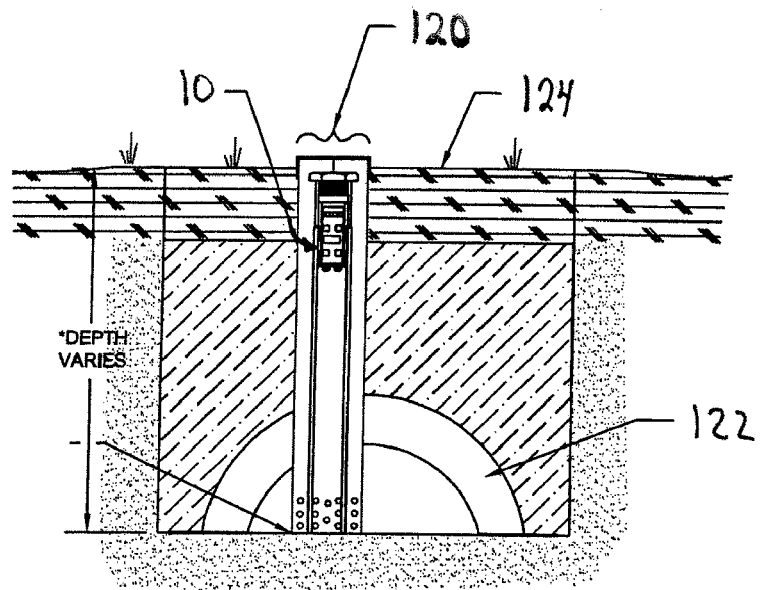
FIG. 5 is a side elevational view, in section, of the liquid level measurement device of FIG. 1 installed in the inspection port of a leaching chamber installation.
Figure 6:
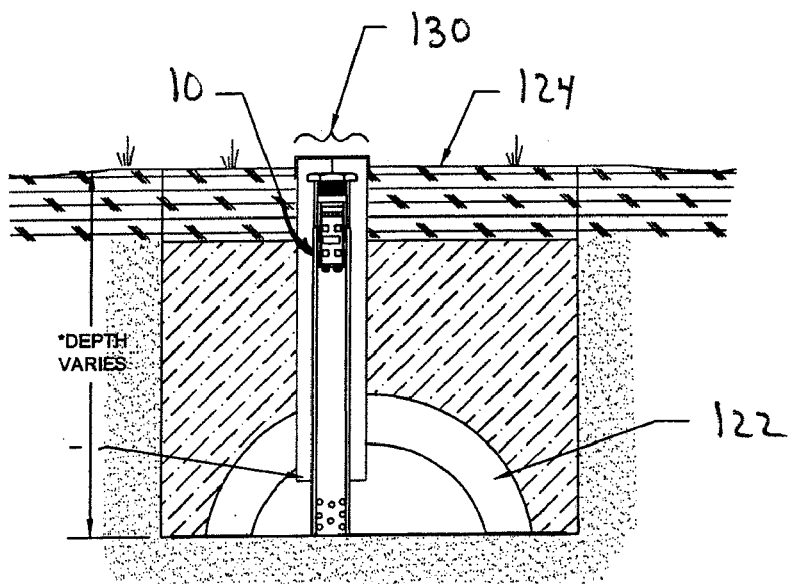
FIG. 6 is a side elevational view, in section, of the liquid level measurement device of FIG. 1, installed in the inspection port of another leaching chamber installation.

FIG. 5 shows the LLM device 10 inserted into an existing inspection port 120 of a leaching chamber installation comprising an underground leaching chamber 122 and a layer of cover or backfill material extending to finished grade 124 disposed on the leaching chamber 122. In this embodiment, both the inspection port 120 and the mounting pipe 22 rest at the bottom of the leaching chamber 122. In the embodiment of FIG. 6, the inspection port 130 is shorter so that only the mounting pipe 22 rests at the bottom of the leaching chamber 122. The inspection ports 120 and 130 in the leaching chamber installations of FIGS. 5 and 6 may be existing inspection ports or newly formed or installed inspection ports.

Figure 7:
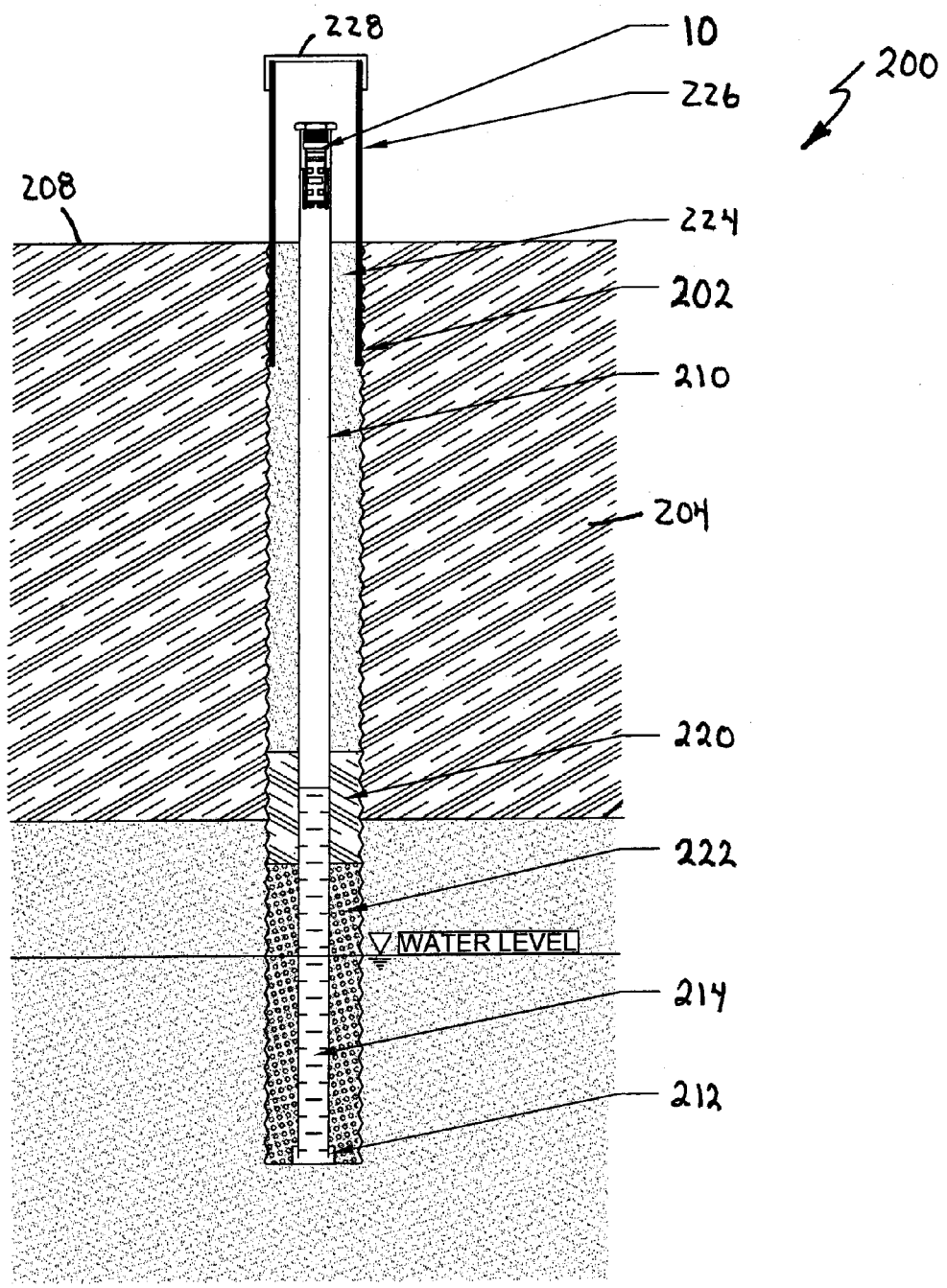
FIG. 7 is a side elevational view, in section, of the liquid level measurement device of FIG. 1, installed in a groundwater well.
Figure 8:
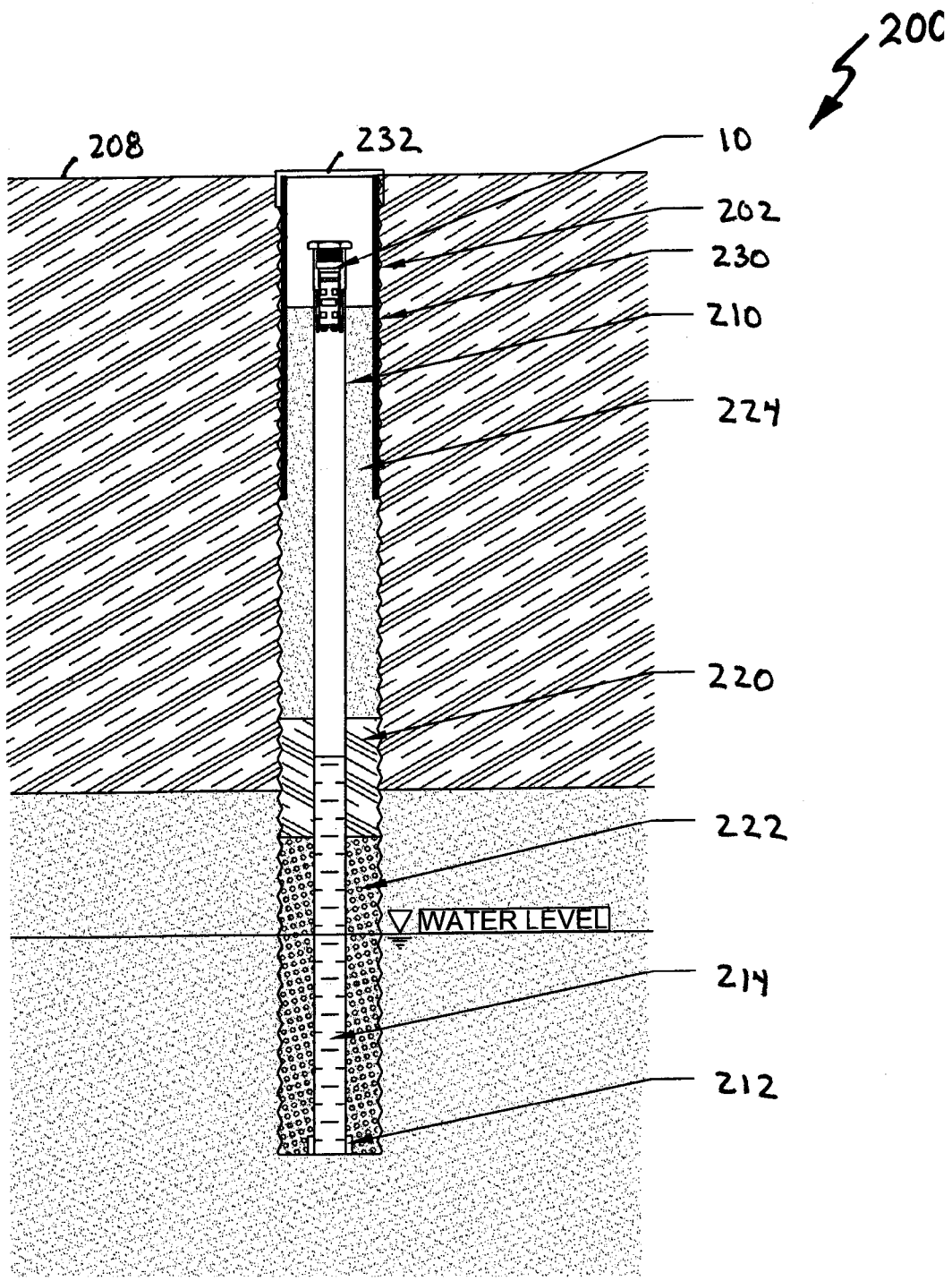
FIG. 8 is a side elevational view, in section, of the liquid level measurement device of FIG. 1, installed in a "flush mount" groundwater well.

FIGS. 7 and 8 show the LLM device 10 installed in various groundwater well monitoring applications for measuring the distance of the liquid level to the LLM device 10 or ground surface. For example, in FIG. 7, the LLM device 10 is shown installed in a groundwater well 200. As can be seen, groundwater well 200 comprises a bore 202 through the ground 204 to a depth below the typical groundwater level. A pipe 210 having a cap 212 at its bottom end is inserted into the bore 202 such that the cap 212 rests at the bottom of the bore 202. The pipe 210 in this embodiment is slotted adjacent its lower region, although those of skill in the art will appreciate that a lower screened region can be employed. The slots 214 allow groundwater to enter the pipe 210. The lower region of the pipe 210 is typically formed of pipe sections that are threaded or otherwise joined together. The pipe sections are designed such that the interior of the pipe appears virtually seamless to avoid discontinuities in the inner surface that may cause ultrasound energy wave reflections. The pipe 210 extends above the ground surface 208 with the open top end of the pipe accommodating the LLM 10. An optional plug 220 formed of bentonite clay or other suitable material seals a section of the bore 202 at a desired location. Packing 222 such as for example, sand or gravel fills the annular region of the bore 202 surrounding the pipe 210 below the plug 220. Backfill 224 such as for example, sand or other suitable material fills the annular region of the bore 202 surrounding the pipe 210 above the plug 220.

An optional protective steel casing 226 is accommodated by the top region of the bore 202 and extends above the pipe 210 and LLM device 10. A cap 228 is provided on the top of the steel casing 226.

In FIG. 8, the top end of the pipe 212 terminates within the bore 202. As a result, the LLM device 10, which is accommodated by the top end of the pipe 210, is positioned below ground level 208. In this case, an optional flush mount protective casing 230 is accommodated by the top region of the bore 202. A cap 232 is provided on the top of the casing 230 and is generally flush with the ground surface 208. The backfill 224 provided in the annular region surrounding the pipe 210 above the plug 220 fills the annular region to a level below the top of the pipe 210 to facilitate access to the LLM device 10.

Although the communications interface in this embodiment is a RS-485 wired communications interface, those of skill in the art will appreciate that other communications interfaces can be used. For example, communications interface 52 may be a wireless Zigbee interface that communicates calculated round trip times generated by the microcontroller 40 to one or more other LLM devices 10 before the calculated round trip times reach the remote control unit. The adjustment of the calculated round trip time to take into account the zero liquid level reading made during calibration can of course be carried out by the remote control unit. The adjustment value may be hard-coded or configurable. If desired, the LLM device 10 may comprise a humidity sensor instead of a temperature sensor. In this case, the output of the humidity sensor is sent to the remote control unit by the microcontroller 40 to adjust the calculated round trip time to take air density into account. Alternatively, the LLM device 10 may include both a temperature sensor and a humidity sensor. In this case, the output of both sensors is sent to the remote control unit by the microcontroller 40 to adjust the calculated round trip time.

If desired, a mechanical backup sensor, such as for example a mechanical float or magnetic reed switch, may be included in the liquid level measurement device.

Rather than using a cap that threadably engages the outer sleeve 18, a slip cap or cover may be used to cover the top of the LLM device 10. Of course, the circuit board 14 need not be suspended within the inner sleeve 16 by a cap 17. The circuit board 14 may be mounted within the inner sleeve 16 in any suitable manner.

The remote control unit may communicate with a single LLM device 10 or may communicate with a series of LLM device 10. In the latter case, the sensed liquid levels for the LLM devices 10 may be displayed individually or together.

The remote control unit may be mounted in the structure that is serviced by the absorption field on its own or near the alarm panel. The remote control unit may also be mounted inside or outdoors. If the remote control unit is mounted outdoors, a sealed weather proof case is used to accommodate and protect the remote control unit. Alternatively, the remote control unit may be a portable wireless receiver that is carried by an operator between absorption field locations.

Rather than having the microcontroller 40 transmit the calculated round trip time to the remote control unit for comparison with the threshold, if desired, the microcontroller 40 can be programmed to compare the calculated round trip time with the threshold and to signal the alarm condition when a high liquid level condition is sensed. The microcontroller can also be programmed to log the sensed liquid levels. In this manner, the need for the remote control unit is obviated.

Also, if desired, rather than using separate transmit and receive transducers 42 and 46, a single transceive transducer may be used both to transmit and receive ultrasound energy.

Although embodiments have been described above with reference to the drawings, those of skill in the art will appreciate that variations and modifications may be made without departing from the spirit and scope thereof as defined by the appended claims.

What is claimed is:

1. A liquid level measurement device comprising:
a hollow seamless pipe defining an interior passage having a substantially constant diameter for insertion into an installation in which liquid level is to be monitored; and
a non-contact sensor assembly disposed within said pipe adjacent an upper end thereof at a location spaced above the liquid, said sensor assembly sensing the level of said liquid and generating output representative of said liquid level, wherein said sensor assembly comprises a transmit transducer transmitting a signal down said pipe towards said liquid, a receive transducer receiving the return signal reflected by the liquid and circuitry verifying that the return signal is the same frequency as the transmitted signal.

2. A liquid level measurement device according to claim 1 wherein said sensor assembly is an ultrasound sensor assembly.

3. A liquid level measurement device according to claim 2 wherein said ultrasound sensor assembly transmits an ultrasound energy wave down said pipe and receives the return ultrasound energy wave reflected by the surface of said liquid.

4. A liquid level measurement device according to claim 3 wherein said sensor assembly measures the time taken for said transmitted ultrasound energy wave to travel to said surface and reflect back to said sensor assembly.

5. A liquid level measurement device according to claim 4 further comprising a communications interface to transmit said output to a remote unit.

6. A liquid level measurement device according to claim 5 wherein said communications interface is a wired communications interface.

7. A liquid level measurement device according to claim 5 wherein said communications interface is a wireless communications interface.

8. A liquid level measurement device according to claim 4 wherein said sensor assembly adjusts the measured time based on environmental conditions.

9. A liquid level measurement device according to claim 8 wherein said environmental conditions comprise at least one of temperature and humidity.

10. A liquid level measurement device according to claim 8 wherein said communications interface is a wireless communications interface.

11. A liquid level measurement device according to claim 4 further comprising a backup mechanical liquid level sensor.

12. A liquid level measurement device according to claim 1 wherein said sensor assembly extends from a cap fitted to the upper end of said pipe.

13. A liquid level measurement device according to claim 12 further comprising a sleeve extending from said cap and surrounding said sensor assembly.

14. A liquid level measurement device according to claim 13 further comprising at least one air relief passageway communicating with the interior of said pipe adjacent said sensor assembly and extending between said pipe and said sleeve.

15. An installation comprising:
an underground region containing liquid;
at least one narrow diameter, hollow seamless pipe extending into said region;
a non-contact liquid level measurement device disposed within said pipe adjacent an upper end thereof, said liquid level measurement device measuring the liquid level in said region, wherein the interior surface of said pipe at least between the liquid in said region and said liquid level measurement device is free of inwardly extending projections; and
at least one air relief passageway communicating with the interior of said pipe adjacent said liquid level measurement device.

16. An installation according to claim 15 wherein said liquid level measurement device is positioned within said pipe in a manner to inhibit interference.

17. An installation according to claim 15 wherein said liquid level measurement device is an ultrasound measurement device.

18. An installation according to claim 17 wherein said underground region contains one of wastewater, stormwater and groundwater.

19. An installation according to claim 17 wherein said ultrasound measurement device transmits an ultrasound energy wave down said pipe, receives the return ultrasound energy wave reflected from the liquid surface and measures the time taken for the ultrasound energy wave to travel to and return from said liquid surface.

20. An installation according to claim 19 wherein said ultrasound measurement device further comprises a communications interface to transmit output representing the measured liquid level to a remote unit.

21. An installation according to claim 20 wherein said communications interface is a wireless communications interface.

22. An installation according to claim 21 wherein said ultrasound measurement device adjusts the measured time based on environmental conditions.

23. An installation according to claim 22 wherein said environmental conditions comprise at least one of temperature and humidity.

24. An installation according to claim 15 wherein said liquid level measurement device comprises a cap fitted to the upper end of said pipe.

25. An installation according to claim 24 further comprising a sleeve extending from said cap and lining a portion of said pipe.

26. An installation according to claim 25 wherein said at least one air relief passageway extends between said pipe and said sleeve.

27. An installation according to claim 15 wherein said liquid level measurement device comprises a transmit transducer transmitting a signal down said pipe towards said liquid, a receive transducer receiving the return signal reflected by the liquid and circuitry verifying that the return signal is the same frequency as the transmitted signal.

* * * * *